(12) United States Patent
Li et al.

(10) Patent No.: US 8,428,060 B2
(45) Date of Patent: Apr. 23, 2013

(54) DETERMINING THE GROUP ADDRESS FOR AN ETHERNET-BASED MULTICAST COMMUNICATION

(75) Inventors: Ming Li, Cupertino, CA (US); Renwei Li, Fremont, CA (US); Weiqian Dai, San Jose, CA (US); Yang Yu, San Ramon, CA (US); Xuesong Dong, Pleasanton, CA (US)

(73) Assignee: Futurewei Technologies, Inc., Plano, TX (US)

( * ) Notice: Subject to any disclaimer, the term of this patent is extended or adjusted under 35 U.S.C. 154(b) by 242 days.

(21) Appl. No.: 12/761,827

(22) Filed: Apr. 16, 2010

(65) Prior Publication Data

US 2010/0272105 A1    Oct. 28, 2010

Related U.S. Application Data

(60) Provisional application No. 61/172,609, filed on Apr. 24, 2009.

(51) Int. Cl.
*H04L 12/28* (2006.01)
*H04L 12/56* (2006.01)

(52) U.S. Cl.
USPC ........................................................ 370/390

(58) Field of Classification Search ................. None
See application file for complete search history.

(56) References Cited

U.S. PATENT DOCUMENTS

| 6,327,621 | B1 * | 12/2001 | Lee et al. | ....................... | 709/227 |
| 6,389,027 | B1 * | 5/2002 | Lee et al. | ....................... | 370/401 |
| 7,477,654 | B2 | 1/2009 | Murray et al. | | |

FOREIGN PATENT DOCUMENTS

| CN | 1610326 A | 4/2005 |
| CN | 1848770 A | 10/2006 |
| CN | 101095331 A | 12/2007 |
| CN | 101141688 A | 3/2008 |

OTHER PUBLICATIONS

"MPC5567 Microcontroller Data Sheet," Document No. MPC5567; Rev. 1.0, Nov. 2007.
Foreign Communication From a Counterpart Application, PCT Application No. PCT/CN2010/072176, International Search Report dated Jul. 29, 2010, 4 pages.
Foreign Communication From a Counterpart Application, PCT Application No. PCT/CN2010/072176, Written Opinion dated Jul. 29, 2010, 5 pages.

* cited by examiner

*Primary Examiner* — Phirin Sam
*Assistant Examiner* — Blanche Wong
(74) *Attorney, Agent, or Firm* — Conley Rose, P.C.; Grant Rodolph; Ryan L. Lobato

(57) ABSTRACT

A communication system, comprising a multicast group address allocator in communication with a plurality of nodes configured as at least one multicast group, wherein, upon creation of a new multicast group from among the nodes, the multicast group address allocator is configured to assign a multicast address to the new multicast group based on the assigned multicast address falling into a hash-bin for each group member of the new multicast group. A multicast group address allocator, comprising a network interface in communication with a plurality of nodes, a controller coupled to the network interface, and a storage medium coupled to the controller, wherein, upon request, the controller assigns a multicast address to a new multicast group from among the nodes, wherein the controller accesses hash-bin information for the nodes and selects the multicast address based on the hash-bin information, and wherein the hash-bin information is stored in the storage medium.

15 Claims, 4 Drawing Sheets

DETERMINING THE GROUP ADDRESS FOR AN ETHERNET-BASED MULTICAST COMMUNICATION

CROSS-REFERENCE TO RELATED APPLICATIONS

The present application claims priority to U.S. Provisional Patent Application No. 61/172,609 filed Apr. 24, 2009 by Ming Li, et al. and entitled "Method to Determine the Group Address for the Ethernet-Based Multicast Communication," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computers and related devices are commonly networked together using known networking schemes to exchange packets or frames of data (often referred to as data packets, data frames, or datagrams). Computers connected to a network are often referred to as hosts. On the Internet, the term host generally means any computer that has full two-way access to other computers on the Internet. Computers tied to a network employ some kind of a connection device, such as a network interface card (NIC) to communicate and exchange data with the network.

A variety of different network types exist. For example, a wide area network (WAN) is a geographically dispersed telecommunications network. A WAN may be privately owned or rented, but the term usually is construed to include public (shared user) networks. A WAN is distinguished as a broader telecommunication structure from that of a metropolitan area network (MAN), which is larger than a local area network (LAN). A LAN is a network of interconnected workstations sharing the resources of a single processor or server within a relatively small geographic area (e.g., an office building). Some common LAN technologies include: Ethernet, token ring, Attached Resource Computer Network (ARCNET), and Fiber Distributed Data Interface (FDDI). A LAN may serve only a few users, or by using FDDI, may serve several thousand over a much wider area. The server will usually have applications and data storage that are shared in common by multiple workstation users.

A LAN server can also be used as a Web server on the Internet if safeguards are taken to secure internal applications and data from outside access. On the Internet, certain protocols are used, including Transmission Control Protocol (TCP) and Internet Protocol (IP). TCP uses a set of rules for exchanging messages with other Internet connections at the information packet level. IP uses a set of rules to send and receive messages at the Internet address level. For IP Version 4, an IP address consists of a 32-bit number and is used to identify each sender and receiver of information that is sent in packets across the Internet. In contrast, IP Version 6 uses 128-bit addresses, and future versions will likely use even more bits to facilitate higher data traffic flows. TCP/IP assigns a unique number (or "IP number") to every workstation. This IP number is a four-byte value that, by convention, is expressed by converting each byte into a decimal number (0 to 255) and separating the bytes with a period. An IP address has two parts: the identifier of a particular network on the Internet (first two bytes) and an identifier of the particular device (which might be a server or workstation and is the second two bytes) within that network. The range of IP addresses is divided into "classes" based upon the high order bits within the 32-bit IP address. Class A addresses are for large networks with many devices, class B addresses are for medium-sized networks, class C addresses are for small networks (e.g., fewer than 256 devices), class D addresses are multicast addresses, and class E addresses are reserved.

The Open Systems Interconnection (OSI) standard is a system for transmission of messages between two points in a telecommunication network. The communication is divided into layers, with each layer adding certain additional functionality. For any given message, there will be a flow of data down through each layer at a sending point. At the receiving point, the data will flow up through the layers. The programming and hardware that furnishes these layers of functionality usually results from a combination of the computer operating system, applications, and TCP/IP or other network protocols. OSI divides a communication into seven layers. The layers may further be divided into two groups, where the upper four layers are used when a message passes from or to a user, and the lower three layers are used when any message passes through the host computer. Messages intended for this computer pass to the upper layers. Messages destined for some other host computer are not passed up to the upper layers but are forwarded to another host.

The seven OSI layers include: Layer 1, the physical layer, which conveys the bit stream through the network at the electrical and mechanical level; Layer 2, the data link layer, which provides error control and synchronization for the physical level; Layer 3, the network layer, which handles the routing and forwarding of data; Layer 4, the transport layer, which manages the end-to-end control and error-checking of data transfer; Layer 5, the session layer, which sets up, coordinates, and terminates conversations, exchanges, and dialogs between the applications at each end; Layer 6, the presentation layer, which is usually part of the operating system and converts incoming and outgoing data from one presentation format to another (e.g., syntax layer); and Layer 7, the application layer, which is where communication partners are identified, quality of service is identified, user authentication and privacy are considered, and constraints on data syntax are identified. Referring again to Layer 2, this protocol layer handles the moving of data in and out across the physical link in a network. Layer 2 contains two sublayers: the Media Access Control (MAC) and the Logical Link Control (LLC). On a LAN, for example, messages are sent between machines by supplying a six-byte unique identifier, which is referred to as the MAC address.

Referring again to IP addresses belonging to Class D, a multicast address is used to send data to a large number of hosts on the Internet, rather than to a specific individual user. Not all hosts will actually use or process such data. Analogized to a radio or TV broadcast, the receiving party must have "tuned" their computer device to receive such data. For multicast addresses (in a 32-bit system), the lowest 4 bits are "1110" followed by the 28-bit multicast address. Hence, every IP datagram whose destination starts with "1110" is an IP multicast datagram. The machine or physical address (e.g., MAC address) used within the local area network of an organization may be different than the IP address on the Internet. A typical example is the 48-bit Ethernet address (with Ethernet being a widely installed LAN technology). TCP/IP includes a facility called the Address Resolution Protocol (ARP) that lets the network administrator create a table that maps the 32-bit (4 byte) IP addresses to the 48-bit (6 byte) MAC addresses. On an Ethernet LAN, the MAC address is typically the same as the Ethernet address.

SUMMARY

In one aspect, the disclosure includes a communication system, comprising a multicast group address allocator in communication with a plurality of nodes configured as at least one multicast group, wherein, upon creation of a new multicast group from among the nodes, the multicast group address allocator is configured to assign a multicast address to the new multicast group based on the assigned multicast address falling into a hash-bin for each group member of the new multicast group.

In another aspect, the disclosure includes a multicast group address allocator, comprising a network interface in communication with a plurality of nodes, a controller coupled to the network interface, and a storage medium coupled to the controller, wherein, upon request, the controller assigns a multicast address to a new multicast group from among the nodes, wherein the controller accesses hash-bin information for the nodes and selects the multicast address based on the hash-bin information, and wherein the hash-bin information is stored in the storage medium.

In a third aspect, the disclosure includes a method for multicast group address allocation, comprising receiving a hash-bin information from a plurality of nodes, receiving a request to assign a multicast address to a new multicast group from among the nodes, and assigning the multicast address based on the received hash-bin information.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A multicast address is transmitted to many hosts on a network. However, not all data frames associated with the multicast address are intended to pass through, and be processed by, the host machine. Hence, filtering of multicast addresses becomes important in order to improve the efficiency of a host machine. In past configurations, a multicast address filter uses the entire six-byte destination address to perform a hashing function. Certain bits of the result will then be used as an index to a hash lookup table, with the table being initialized by a host machine driver or embedded firmware. If the indexed value in the lookup table is set, then the received data packet is passed through the filter and onto the host machine for further processing. If the indexed value in the lookup table is not set, then the data packet is discarded.

Hashing is the transformation of a string of characters into a usually shorter fixed-length value or key that represents the original string. Hashing is used to index and retrieve items from a table (or database). In general, hashing proves to be a faster method for indexing and finding an item, as it uses the shorter hashed key, rather than the original (longer) value. The hashing algorithm is called the hash function. Generally, a first hashed string will produce a different value than a second hashed string. However, the likelihood of the same resulting value from two different strings being produced by the hashing function increases as the number of bits (e.g. hash index length) output by the hash function decreases. The hash function and the number of output bits depend upon the MAC chips used.

The probability of identical hash function values being produced from different input strings is extremely small, particularly as the number of bits output by the hash function approaches the number of bits input. In practice, however, a significantly smaller portion of the bits are actually used. For instance, 48 address bits are hashed down to 32 bits, thereby increasing the chance of duplication. Of the resulting 32 bits, an even smaller number of the bits are typically used to form the index. These factors substantially increase the chances of two indexes to the hash table being the same. This situation results in unwanted data frames being uploaded to the host machine, which consumes valuable processing power from the host central processing unit (CPU).

Figure 1:
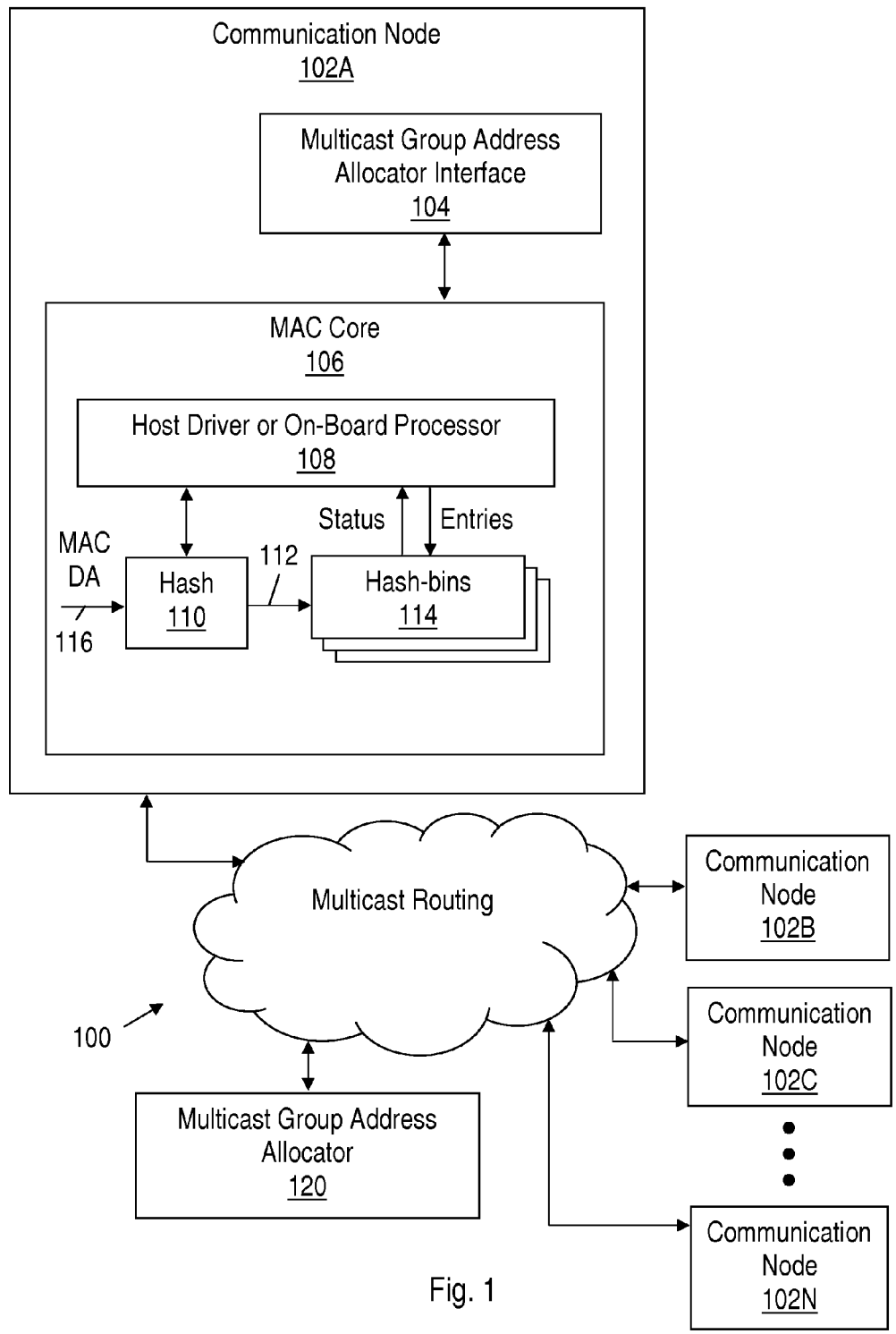
FIG. 1 illustrates a multicast communication system in accordance with an embodiment of the disclosure.

FIG. 1 illustrates a multicast communication system 100 in accordance with an embodiment of the disclosure. As shown, the multicast communication system 100 comprises a plurality of communication nodes 102A-102N configured to communicate based on multicast group address allocator operations. In at least some embodiments, the communication nodes 102A-102N are part of a wireless local area network (WLAN). For example, at least one of the communication nodes 102A-102N may be an access point that provides wireless data and/or communication services (e.g., telephone services, Internet services, data services, messaging services, instant messaging services, electronic mail (email) services, chat services, video services, audio services, gaming services, etc.), while the other communication devices are any of a variety of fixed-location and/or mobile wireless devices or stations (STAs). It should be appreciated that the communication system 100 is meant to be illustrative and not exhaustive. For example, it should be appreciated that more, different, or fewer communication nodes 102A-102N may be used to implement embodiments of the disclosure.

The communication nodes 102A-102N may comprise any variety of mobile devices and/or personal computers (PCs) with wireless communication capabilities, a personal digital assistant (PDA) or MP3 player, a wireless telephone (e.g., a cellular phone, a smart phone, etc.), and a laptop computer with wireless communication capabilities. In at least some embodiments, the communication devices 102A-102D are implemented in accordance with at least one wired and/or wireless communication standard (e.g., from the Institute of Electrical and Electronics Engineers (IEEE) 802.11 family of standards).

In accordance with embodiments, at least one of the communication nodes 102A-102N operates as a multicast sender while the other communication devices operate as multicast receivers. It should be understood that all of the communication nodes 102A-102N are capable of operating as both a multicast sender and a multicast receiver. In other words, the same communication device is able to perform multicast sender operations and multicast receiver operations. As previously mentioned, the multicasting performed by the communication nodes 102A-102N is carried out based on multicast group address allocator operations as described herein. The multicast group address allocator operations described herein may be performed, for example, by one of the communication nodes 102A-102N or by a separate management device in communication with the communication nodes 102A-102N.

In FIG. 1, various components of the communication node 102A are discussed. The discussion for communication node 102A also applies to the other communication nodes 102B-102N. As shown, the communication node 102A comprises a multicast group address allocator interface 104 coupled to (or part of) a MAC core 106. The multicast group address allocator interface 104 facilitates communications between the communication node 102A and the multicast group address allocator 120, which provides centralized group address assignment functions for the communication system 100.

In at least some embodiments, the MAC core 106 performs MAC address filtering for the communication node 102A. In this manner, the host processor (not shown) is relieved from filtering unwanted MAC addresses. As shown, the MAC core 106 comprises a hashing device 110. The hashing device 110 performs, for example, a cyclic redundancy checking (CRC) function on a certain number of bits of an incoming MAC destination address (DA). Although CRC may be used to check for errors in received data that has been transmitted on a communications link, the hashing device 110 may use CRC as a hashing function to transform a bit stream into a simpler representative value. As an example, certain lower bits of an incoming 6-byte MAC destination address may be used to generate a CRC value. Further, certain bits of the resulting CRC value are used for the hashed value. Mathematically, many thousands of MAC addresses will hash to the same value, but as more bits are used, the chances decrease of the same hashed value being produced for two different input strings. To speed up the processing, however, the number of bits used will generally depend upon the MAC chips used. Other relatively simple hash functions which may be used herein and are known in the relevant art include: the division-remainder method, folding, radix transformation, and digit rearrangement.

Regardless of the particular hashing operation, the hashing device 110 produces an index value 112 which is used to search through hash-bins 114. The hash-bins 114 contain status entries (typically "1" or "0") representing the validity of the data frame associated with each MAC destination address. The hash-bin entries are entered, for example, by a driver on the host computer, or embedded firmware of a NIC. The hash-bin entries are indexed according to the index values 112, which enable the hash-bins to be quickly searched to provide the status of the data frame corresponding to each incoming MAC destination address 116. For example, if the status is set to "1," then a received data packet passes the filtering operation of the MAC core 106 and is uploaded to the host for further processing. Otherwise, the received data packet is discarded by either a host driver or on-board processor, represented by component 108.

One of the main reasons unwanted multicast traffic is not filtered out is that multiple multicast addresses can be hashed into the same hash bin. Of the hashed multicast addresses, some multicast addresses are of interest to the receiving node, while others are unwanted. For a given number of groups (N groups), the issues that need to be addressed are: 1) how to select the N multicast addresses (each group is assigned to a different MAC address); and 2) how to assign a multicast address from the N multicast addresses for a new group. In accordance with at least some embodiments, the multicast group address allocator 120 performs multicast group address assignment and allocation to handle these two issues in a manner that enables all or most unwanted multicast traffic received by a node to be filtered out by MAC hardware. In this manner, host CPU involvement for dealing with the unwanted multicast traffic is minimized. In order to determine the multicast addresses, the centralized address allocator needs to know: 1) the max number of groups the system will support; and 2) the hash function and the number of hash bin used in the MAC chip.

In at least some embodiments, multicast address selection and assignment are based on two principles. The first principle is that smaller numbers of multicast addresses assigned to each hash-bin is preferred. The explanation is that when a node needs to enable a new hash-bin (e.g., when creating/joining a group), the wanted multicast traffic in this enabled hash-bin should only be addressed to this group. However, some unwanted multicast traffic may be hashed into this hash-bin as well. If the number of multicast addresses assigned to this hash-bin is small, then less unwanted multicast traffic can enter into this hash-bin. In the ideal case, each bin is only assigned one multicast address. In this manner, no unwanted multicast traffic can be hashed into the enabled hash-bin.

To summarize, for a given number of groups, the number of multicast addresses assigned to each hash-bin (e.g., hash-bins 114) should be minimized. This first principle can be achieved if the multicast addresses are assigned to each bin evenly. As an example, for a communication system with a given number of groups (MAX_GRP), the bins of a communication node will be assigned MAX_GRP/NUM_BINS multicast addresses, where NUM_BINS is the number of hash-bins in the particular communication node.

The second principle is that smaller numbers of enabled hash-bins in a communication node is preferred. The explanation is that when a communication node creates a group, a multicast address is assigned to this group. The assigned multicast address may enable a new hash-bin or may fall into an existing enabled hash-bin. If there are higher numbers of enabled hash-bins, then more unwanted multicast traffic will enter the enabled hash-bins.

As an example, suppose MAX_GRP=1024 and NUM_BINS=128. Based on the two principles describe herein, each hash-bin will be assigned eight (1024/128) multicast addresses. If a node creates 16 groups, there are two ways to assign the 16 multicast addresses to the groups. In the first way, the 16 multicast addresses fall into two hash-bins. For this first way, there is not any unwanted multicast traffic in the two enabled hash-bins because each multicast address in the two hash-bins belongs to one of 16 groups. In the second way, the 16 multicast addresses fall into 16 hash-bins. For this second way, only one multicast address in each enabled hash-bin is valid for this node. The other seven multicast addresses (note that each hash-bin is assigned 8 multicast addresses) in each enabled hash-bin are not used by this node, but may be used by other nodes. Although the multicast traffic for these seven multicast addresses is unwanted multicast traffic for this node, it will be accepted by this communication node because it falls into the enabled hash-bins. Accordingly, for the given number of groups, the enabled hash-bins in each communication node (or most nodes) should be minimal.

For the first issue mentioned previously (e.g., how to select the N multicast addresses for a given N groups), the first principle indicates that the multicast addresses selected for a given number of groups should be equally distributed in each hash-bin for each node. Such distribution may be complicated due to: 1) the number of hash-bins in the different nodes may be different; and/or 2) the hash-index for different nodes may be determined in different ways. Accordingly, in at least some embodiments, the multicast group address allocator 120 employs heuristics to find N multicast addresses, which are to be equally distributed in each bin for each node, if possible. The task of selecting the N multicast addresses needs to know: 1) the max number of groups the system will support; 2) the hash function and the number of hash bin used in the MAC chip; and 3) the selected multicast address space. These data can be known in the system design. In the real world, the number of groups is usually less than 2,000, the number of hash-bins is less than a 1,000, and the selected multicast address space is about $2^{24}$.

For the second issue mentioned previously (e.g., how to assign a multicast address from the N multicast addresses for a new group), the second principle indicates that when a node creates a group, the assigned multicast address should minimize the enabled bins in each node (or most nodes) in the system. If only the node creating the group is considered, then multicast address assignment is straightforward because only the hash-bins in this node are considered. However, the multicast address assignment implemented for one node may not be optimal for other nodes. Accordingly, in at least some embodiments, the multicast group address allocator 120 should have all of the hash-bin information for each of the communication nodes 102A-102N. When one of the communication nodes 102A-102N creates a group and the group members may be determined from known information (in some cases, the group members may not be known at the time when a group is created), the multicast group address allocator 120 assigns a multicast address to the group based on the assigned multicast address falling into one of the enabled hash-bins for the requesting node and all group member nodes, if possible.

To summarize, upon creation of a new multicast group in the communication system 100, the multicast group address allocator 120 is configured to assign a multicast address to the new multicast group based on the assigned multicast address falling into an enabled hash-bin for each group member of the new multicast group. If the new multicast group comprises known group members and unknown group members, the multicast group address allocator 120 is configured to assign a multicast address to the new multicast group based on the assigned multicast address falling into an enabled hash-bin for each known group member of the new multicast group. Periodically, the enabled hash-bins information tracked by the multicast group address allocator 120 (e.g., as additional bins are enabled or as previously unknown nodes become known to the multicast group address allocator 120).

The multicast group address allocator 120 also performs multicast address distribution to the communication nodes 102A-102N of the communication system 100. For example, if there are N multicast groups, the multicast group address allocator 120 is configured to distribute N multicast addresses about equally among enabled hash-bins for each of the plurality of communication nodes 102A-102N. The actual values for the N multicast addresses distributed by the multicast group address allocator 120 may be determined based on heuristics with: 1) a maximum group number (e.g. N); 2) a maximum hash-bin number; and 3) a minimum multicast address space number.

Figure 2:
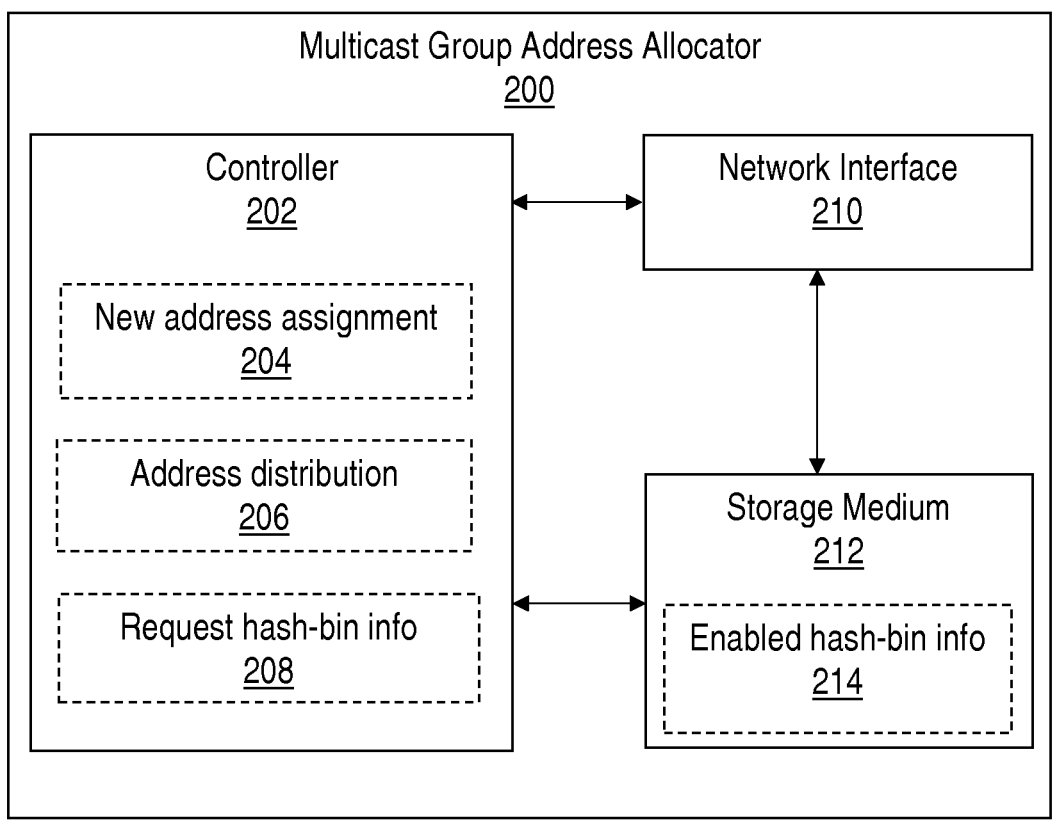
FIG. 2 illustrates a multicast group address allocator in accordance with an embodiment of the disclosure.

FIG. 2 illustrates a multicast group address allocator 200 in accordance with an embodiment of the disclosure. For example, the multicast group address allocator 200 may correspond to the multicast group address allocator 120 of FIG. 1. In accordance with at least some embodiments, the multicast group address allocator 200 may be incorporated into one of the communication nodes 102A-102N. Alternatively, the multicast group address allocator 200 is separate from the communication nodes 102A-102N.

As shown, the multicast group address allocator 200 comprises a network interface 210 for communications with the communication nodes 102A-102N. The multicast group address allocator 200 also comprises a storage medium 212 (e.g., volatile or non-volatile memory) for storing enabled hash-bin information received from communication nodes. The operations of the multicast group address allocator 200 are managed by a controller 202. For example, the controller 202 may correspond to a processor that executes instructions and/or other hardware.

In at least some embodiments, the controller 202 manages a new address assignment operation 204, an address distribution operation 206, and a request hash-bin information operation 208. The new address assignment operation 204 is performed, for example, when a new group is created by one of a plurality of communication nodes. In response, the new address assignment operation 204 selects and assigns a multicast address for the new group based on the enabled hash-bin information 214 stored in the storage medium 212 or accessible by other means. The enabled hash-bin information 214 is stored and/or updated by performing the request hash-bin information operation 208, which causes the nodes in communication with the multicast group address allocator 200 to provide/update the enabled hash-bin information 214. Alternatively, nodes in communication with the multicast group address allocator 200 may be configured to provide/update the enabled hash-bin information 214 without waiting for requests from the multicast group address allocator 200.

The address distribution operation 206 is configured to distribute N multicast addresses, for N groups, about equally among enabled hash-bins for each of the plurality of nodes in communication with the multicast group address allocator 200. In at least some embodiments, the distributed N multicast addresses are selected based on heuristics with: 1) a maximum group number (e.g. N); 2) a maximum hash-bin number; and 3) a minimum multicast address space number.

Figure 3:
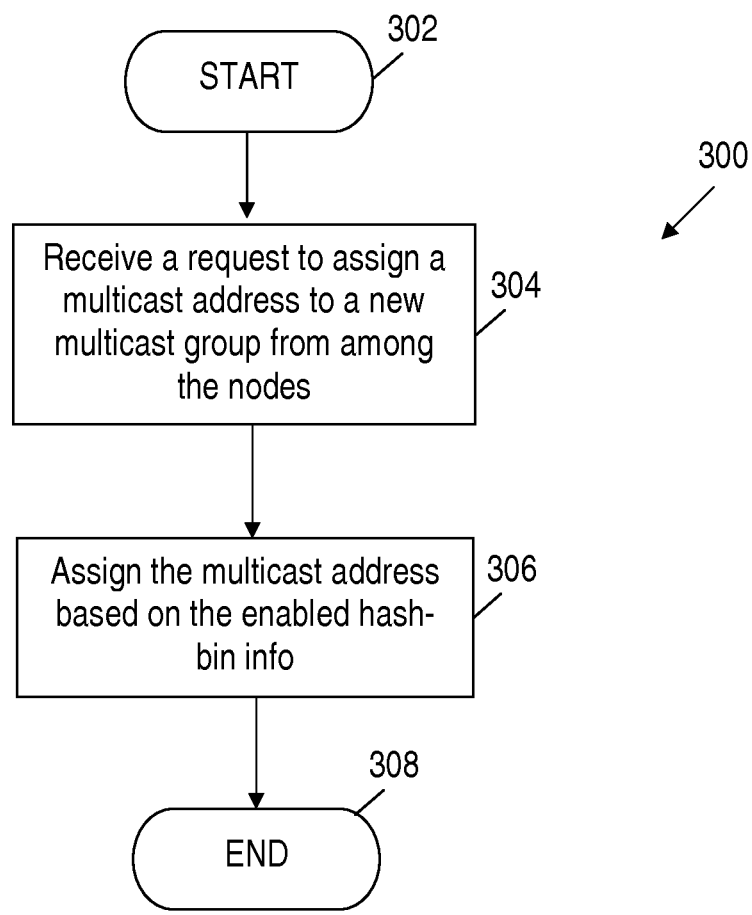
FIG. 3 illustrates a multicast group address allocation method in accordance with an embodiment of the disclosure.

FIG. 3 illustrates a multicast group address allocation method 300 in accordance with an embodiment of the disclosure. The method 300 may be performed, for example, by the multicast group address allocator 200. As shown, the method 300 starts at block 302 and continues to block 304, where a request to assign a new multicast address to a new group is received. At block 306, the new multicast address is assigned based on the enabled hash-bin information, which is stored on the centralized address allocator (this is known information because the number of hash bin and the assigned multicast addresses in the each receiver is known). In other words, the new multicast address should fall within an enabled hash-bin for each of the communication nodes in the new group, if possible.

As shown, the method 300 ends at block 308. However, as an additional step, the method 300 may further comprise distributing N multicast addresses, for N groups, about equally among enabled hash-bins for each of a plurality of nodes.

Figure 4:
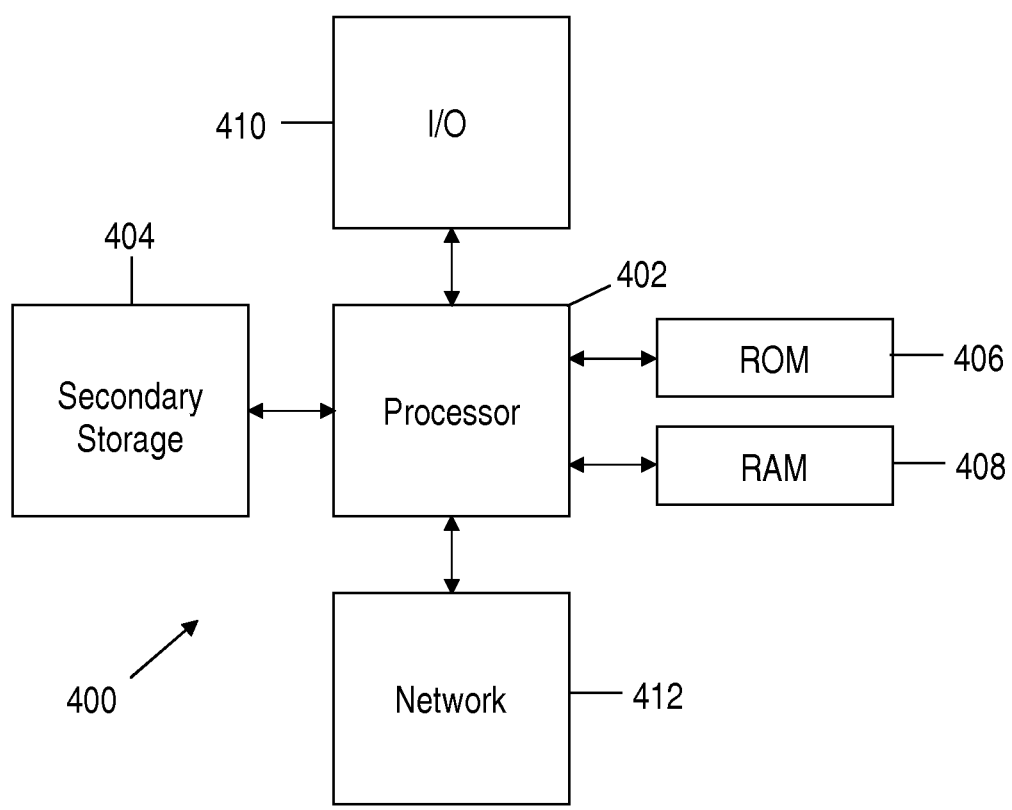
FIG. 4 illustrates a computer system in accordance with an embodiment of the disclosure.

The multicast group address allocation techniques described herein may be implemented on any general-purpose communication device with sufficient processing power, memory resources, and network throughput capability to handle the necessary workload placed upon it. FIG. 4 illustrates a typical, general-purpose communication device 400 suitable for implementing one or more embodiments of the components disclosed herein. The communication device 400 comprises a processor 402 (which may be referred to as a central processor unit or CPU) that is in communication with memory devices including secondary storage 404, read only memory (ROM) 406, random access memory (RAM) 408, input/output (I/O) devices 410, and network connectivity devices 412. The processor 402 may be implemented as one or more CPU chips, or may be part of one or more application specific integrated circuits (ASICs).

The secondary storage 404 is typically comprised of one or more disk drives or tape drives and is used for non-volatile storage of data and as an over-flow data storage device if RAM 408 is not large enough to hold all working data. Secondary storage 404 may be used to store programs that are loaded into RAM 408 when such programs are selected for execution. The ROM 406 is used to store instructions and perhaps data that are read during program execution. ROM 406 is a non-volatile memory device that typically has a small memory capacity relative to the larger memory capacity of secondary storage 404. The RAM 408 is used to store volatile data and perhaps to store instructions. Access to both ROM 406 and RAM 408 is typically faster than to secondary storage 404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, e.g., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A communication system, comprising:
a multicast group address allocator in communication with a plurality of nodes configured as at least one multicast group,
wherein, upon creation of a new multicast group from among the nodes, the multicast group address allocator is configured to assign a multicast address to the new multicast group such that, for a plurality of group members each corresponding to a respective one of a plurality of group member associated hashes, a group member associated hash of the assigned multicast address for the corresponding group member produces an entry corresponding to a previously enabled hash-bin from a plurality of hash-bins for the corresponding group member of the new multicast group,
wherein each group member has its own hash function and its own hash-bins, and
wherein the enabled hash-bins correspond to multicast traffic that is wanted by the corresponding group member.

2. The communication system of claim 1, wherein the multicast group address allocator is configured to receive and store hash-bin information for the nodes.

3. The communication system of claim 1, wherein, if the new multicast group comprises known group members and unknown group members, the multicast group address allocator is configured to assign a multicast address to the new multicast group based on, a group member hash of the assigned multicast address producing an entry corresponding to a hash-bin for a previously enabled hash-bin of the known group member for each known group member of the new multicast group, and wherein each group member has its own hash function and previously enabled hash-bins.

4. The communication system of claim 1, wherein, for N multicast groups, the multicast group address allocator is configured to distribute N multicast addresses about equally among hash-bins for each of the nodes, and wherein N is an integer.

5. The communication system of claim 4, wherein the multicast group address allocator is configured to determine the distributed N multicast addresses based on applying a heuristics method until the N multicast addresses are found.

6. The communication system of claim 5, wherein the heuristics method is used to determine the N multicast addresses with the following inputs: a group number, a hash function, a number of hash bins, and a multicast address space.

7. A multicast group address allocator, comprising:
    a network interface in communication with a plurality of nodes;
    a controller coupled to the network interface; and
    a storage medium coupled to the controller,
    wherein, upon request, the controller assigns a multicast address to a new multicast group from among at least a subset of the nodes,
    wherein the controller accesses hash-bin information for the nodes and selects the multicast address for the new multicast group based on the hash-bin information,
    wherein each node has its own node hash-bin information,
    wherein the hash-bin information comprises the node hash-bin information from each node, and
    wherein the hash-bin information is stored in the storage medium of the multicast group address allocator.

8. The multicast group address allocator of claim 7, wherein, if the new multicast group comprises known group members and unknown group members, the controller is configured to assign a multicast address to the new multicast group based on the hash-bin information for the known group members.

9. The multicast group address allocator of claim 7, wherein, for N multicast groups, the controller is configured to distribute N multicast addresses about equally among hash-bins for each of the nodes, and wherein N is an integer.

10. The multicast group address allocator of claim 9, wherein the controller is configured to determine the distributed N multicast addresses based on applying heuristics until the distributed N multicast addresses are found.

11. The multicast group address allocator of claim 10, wherein the heuristics assume a maximum group number, a maximum hash-bin number, and a minimum multicast address space number.

12. A method for multicast group address allocation, comprising:
    receiving a hash-bin information for each node from a plurality of nodes;
    receiving a request to assign a multicast address to a new multicast group from among the nodes, wherein the new multicast group comprises members selected from the plurality of nodes; and
    assigning the multicast address for the new multicast group based on the received hash-bin information from each of the nodes,
    wherein each node comprises node hash-bin information, and
    wherein the received hash-bin information comprises the node hash-bin information from each node.

13. The method of claim 12 further comprising requesting updated hash-bin information from the nodes.

14. The method of claim 12 further comprising, for N multicast groups, distributing N multicast addresses about equally among hash-bins for each of the nodes, and wherein N is an integer.

15. The method of claim 14 further comprising determining the N multicast address based on applying heuristics until the distributed N multicast addresses are found.

* * * * *